US008189790B2

(12) United States Patent
Bilodi et al.

(10) Patent No.: US 8,189,790 B2
(45) Date of Patent: May 29, 2012

(54) DEVELOPING INITIAL AND SUBSEQUENT KEYID INFORMATION FROM A UNIQUE MEDIAID VALUE

(75) Inventors: Prakash Bilodi, Santa Clara, CA (US); Lyndon Siao, San Jose, CA (US); Narada Hess, Menlo Park, CA (US); Jitendra Kumar Singh, Los Gatos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 428 days.

(21) Appl. No.: 12/541,784

(22) Filed: Aug. 14, 2009

(65) Prior Publication Data

US 2011/0038479 A1    Feb. 17, 2011

(51) Int. Cl.
*H04L 9/00*    (2006.01)
*H04L 9/32*    (2006.01)

(52) U.S. Cl. ........... 380/277; 380/44; 713/181; 713/193

(58) Field of Classification Search .......... 380/277–278, 380/286, 44–45; 713/181, 193–194; 726/26–27, 726/30
See application file for complete search history.

(56) References Cited

U.S. PATENT DOCUMENTS

| | | | | |
|---|---|---|---|---|
| 5,995,623 | A * | 11/1999 | Kawano et al. | 713/189 |
| 7,088,822 | B2 * | 8/2006 | Asano | 380/45 |
| 2008/0137848 | A1 * | 6/2008 | Kocher et al. | 380/201 |
| 2011/0255690 | A1 * | 10/2011 | Kocher et al. | 380/210 |

OTHER PUBLICATIONS

HP StorageWorks Secure Key Manager Data Sheet, © Sep. 1, 2008, Hewlett-Packard Development Company, L.P.
HP StorageWorks Secure Key Manager, Key Protection Best Practices Manual, © Dec. 2, 2008, Hewlett-Packard Development Company, L.P.
RSA® Key Manager with Application Encryption Product Data Sheet, © 2008-2009 RSA Security Inc.
RSA® Encryption and Key Management Suite, RSA Solution Brief, © 2008 RSA Security, Inc.
RSA® Key Management With Brocade Encryption Solutions, RSA Solution Brief, © 2009 Brocade Communications Systems, Inc. and RSA, the Security Division of EMC.
Enterprise Key Management, Deploying a new generation of solutions for enterprise key management, © 2009 RSA Security, Inc.
Securing Data at Rest: Developing a Data base Encryption Strategy, A White Paper for Developers, e-Business Managers and IT, © 2002 RSA Security, Inc.
Design and Implementation for RSA® Key Manager with Application Encryption, Services Data Sheet, © 2007-2008 RSA Security, Inc.
Data Center Fabric, Data-at-Rest Encryption Scenarios Technical Brief, © 2008 Brocade Communications Systems, Inc.

(Continued)

*Primary Examiner* — Hosuk Song
(74) *Attorney, Agent, or Firm* — Wong, Cabello, Lutsch, Rutherford & Brucculeri, L.L.P.

(57) ABSTRACT

A technique for using a key repository to store data encryption keys provides a way to access key records in the key repository using a key identifier constructed from a media identifier associated with a data storage medium on which encrypted data is or will be stored. The media identifier is hashed and added to a counter value to produce the key identifier. In some embodiments, the technique is implemented in an encryption switch that provides data-at-rest encryption for a storage access network, but in other embodiments, the technique may be implemented in other devices, including data storage devices and hosts.

26 Claims, 8 Drawing Sheets

OTHER PUBLICATIONS

Data Center Fabric, Data-at-Rest Encryption Solutions Technical Brief, © 2008 Brocade Communications Systems, Inc.

Brocade FS8-18 Encryption Blade Data Sheet, A High-Performance Encryption Blade for the Brocade DCX Backbone Family, © 2009 Brocade Communications Systems, Inc.

Brocade Encryption Switch Data Sheet, High-Performance Encryption for Data-at-Rest, © 2009 Brocade Communications Systems, Inc.

TechWorld, "Security: the protocol is the key" by Chris Mellor, dated Oct. 30, 2007, generated on Aug. 7, 2009, obtained from http://www.techworld.com.

"Secure Hash Standard", Federal Information Processing Standards Publication 180-2, Aug. 1, 2002.

"Security Requirements for Cryptographic Modules", Federal Information Processing Standards Publication 140-2 (Supercedes FIPS PUB 140-1, Jan. 11, 1994), May 25, 2001.

"Advanced Encryption Standards (AES)", Federal Information Processing Standards Publication 197, Nov. 26, 2001.

HP, "HP StorageWorks Secure Key Manager—Specifications", generated on Aug. 5, 2009, obtained from http://www.hp.com.

RSA, "RSA Encryption and Key Management Suite", generated on Aug. 5, 2009, obtained from http://www.rsa.com.

RSA, "RSA Key Manager with Application Encryption", generated on Aug. 5, 2009, obtained from http://www.rsa.com.

"KMIP—Key Management Interoperability Protocol", editor: Robert Haas, Draft Version 0.98, last revision Feb. 10, 2009, © 2009 EMC, Hewlett Packard Development Corporation, IBM, and Thales.

NetApp, "NetApp Lifetime Key Management", generated on Aug. 5, 2009, obtained from http://www.netapp.com.

NetApp, "NetApp DataFort Security Systems", generated on Aug. 5, 2009, obtained from http://www.netapp.com.

"Storage Area Network, NetApp Lifetime Key Management Appliance with Brocade Encryption Solutions" Technical Brief, © 2008 NetApp., © 2008 Brocade Communications Systems, Inc.

"NetApp Lifetime Key Management, Improve access to encrypted data by simplifying key management", © 2008 NetApp.

RSA Solution Brief: RSA® Key Manager with Application Encryption, Managing the Lifecycle of Encryption Keys, © 2006-2008 RSA Security, Inc.

IBM, "Centralize and simplify encryption key management", generated on Aug. 5, 2009, obtained from http://www-01.ibm.com.

SAN data Sheet, Brocade SANtegrity Security Suite: Reduce Risks to Data While Assuring Availability, © 2007 Brocade Communications Systems, Inc.

NetApp Technical Report "NetApp DataFort® Integration with Nearstore® VTL" by Sanjy Jagad, Network Appliance, Inc., Aug. 2007, © 2007 Network Appliance, Inc.

* cited by examiner

DEVELOPING INITIAL AND SUBSEQUENT KEYID INFORMATION FROM A UNIQUE MEDIAID VALUE

TECHNICAL FIELD

The present invention relates to the field of storage area networks, and in particular to data-at-rest encryption in storage area networks.

BACKGROUND ART

Managing operational risk by protecting valuable digital assets has become increasingly critical in modern enterprise information technology (IT) environments. In addition to achieving compliance with regulatory mandates and meeting industry standards for data confidentiality, IT organizations must also protect against potential litigation and liability following a reported breach.

In the context of data center fabric security, operators of Storage Area Networks (SANs) have desired fabric-based encryption services to secure data assets either selectively or on a comprehensive basis.

Most sensitive corporate data is stored in the data center, and the vast majority of data from critical applications resides in a SAN, enabling organizations to employ the intelligence of the storage fabric as a centralized framework in which to deploy, manage, and scale fabric-based data security solutions.

The storage fabric enables centralized management to support various aspects of the data center, from server environments and workstations to edge computing and backup environments, providing a place to standardize and consolidate a holistic data-at-rest security strategy. Organizations can also implement data-at-rest encryption in other parts of the data center, helping to protect data throughout the enterprise.

Most current industry solutions include either host-based software encryption, device-embedded encryption, or edge encryption, all of which provide isolated services to specific applications but typically cannot scale across extended enterprise storage environments.

Some solutions have provided centralized encryption services that employ key repositories such as provided by several vendors. These key repositories can be considered specialized secure databases of the encryption keys used by the SAN for encrypting data at rest on the media controlled by the SAN. Each key stored by the key repository is associated with a key identifier that can be used to obtain the key from the key repository. The key identifier is typically randomly chosen by software external to the key repository. But performance and manageability of systems that employ key repositories has been less than desired, in part because of a need to maintain tables that associate encryption key identifiers with the media that is to be encrypted or decrypted.

In addition to performance impact of the lookup times required to first lookup the key identifier in the lookup tables, additional management costs are associated with this technique. In SANs with multiple clusters of equipment, these lookup tables are typically stored in each cluster of the SAN, and require careful management to maintain consistency of the information stored therein. Furthermore, data at rest encryption often employs rekeying techniques to avoid stale keys. In such systems, there may be a need to be able to determine previous key generations, but because the key identifiers are randomly selected, determining previous generation key identifiers is typically not straightforward.

SUMMARY OF INVENTION

According to one embodiment, a method comprises hashing a media identifier associated with a data storage medium to produce a base key identifier; adding a counter value to the base key identifier to produce a key identifier; and accessing a key record associated with the key identifier in a key repository.

According to another embodiment, a machine-readable storage medium stores instructions for a programmable device wherein the instructions cause a processor of the programmable device to perform the method described above.

According to yet another embodiment, a programmable device comprises a processor and a storage medium, operatively coupled to the processor, on which is stored software which when executed by the processor causes the processor to perform actions that comprise hashing a media identifier associated with a data storage medium to produce a base key identifier; adding a counter value to the base key identifier to produce a key identifier; and accessing a key record associated with the key identifier in a key repository.

According to yet another embodiment, a system comprises a key repository, configured to store data encryption keys and an encryption device that comprises a processor and a storage medium, operatively coupled to the processor, on which is stored software which when executed by the processor causes the processor to perform actions that comprise hashing a media identifier associated with a data storage medium to produce a base key identifier; adding a counter value to the base key identifier to produce a key identifier; and accessing a key record associated with the key identifier in the key repository.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Although the following disclosure is written in the context of a SAN, the scope of the present invention is not limited to a SAN, but includes any type of system in which a key repository is accessed by a key identifier for a key that is associated with media that has been or will be encrypted or decrypted using that key. Furthermore, although the embodiments describe below employ disclosed techniques for generating keyIDs in an encryption switch, the scope of the present invention is not so limited, and includes the use of such techniques in other types of devices, such as hosts or storage devices.

Figure 1:
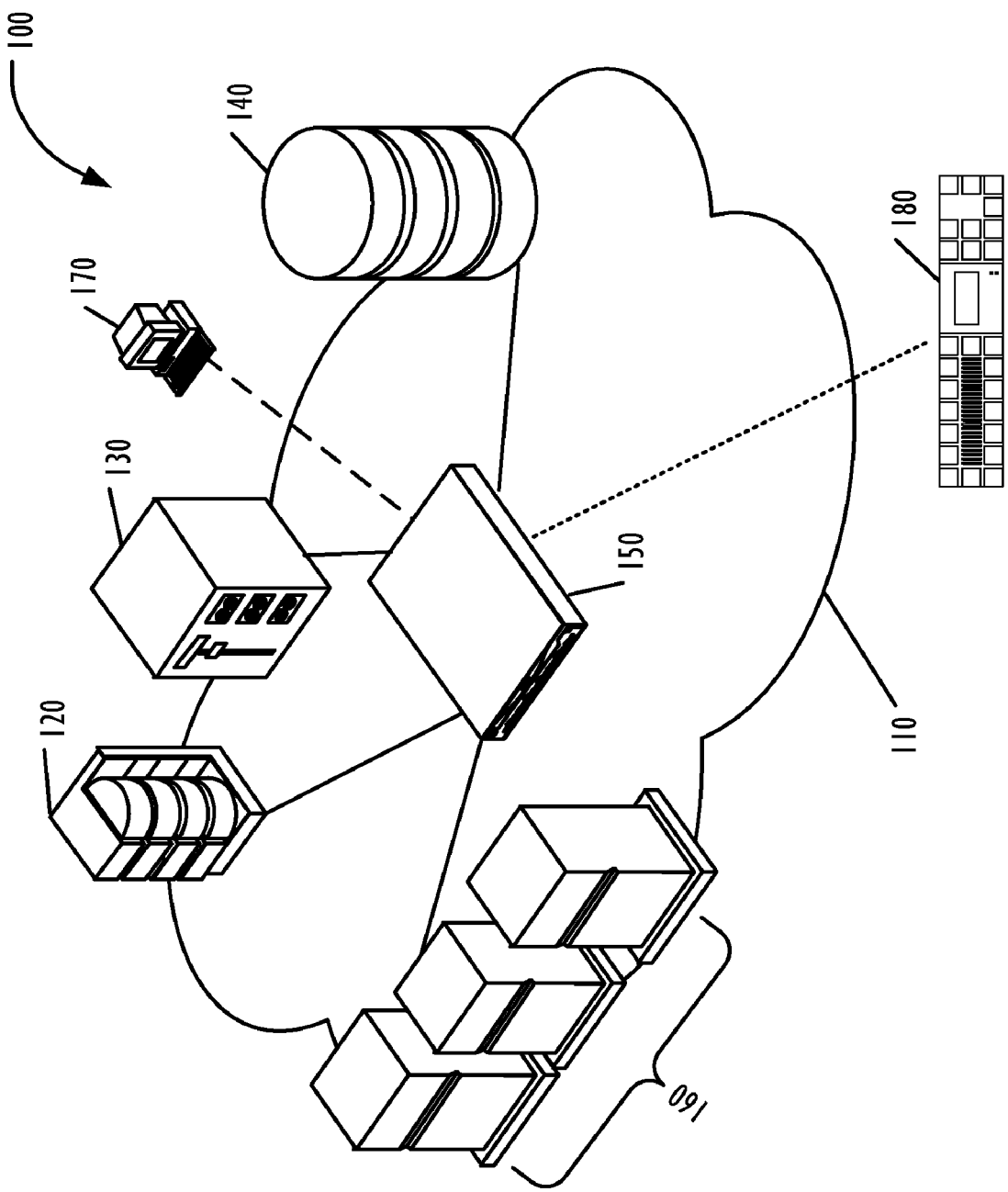
FIG. 1 is a block diagram illustrating an architecture for a SAN that employs embodiments of the present invention.

FIG. 1 is a block diagram illustrating an architecture for a SAN 100 that employs embodiments of the present invention. As illustrated in FIG. 1, the SAN fabric 110 includes an encryption switch 150, which can interact with the switches, hosts, and storage devices connected to the SAN fabric 110. In this example, the SAN 100 includes a Redundant Array of Independent Disks (RAID) 120, a tape library 130, JBOD ("just a bunch of disks") 140, a switch 150, and a cluster of servers 160. The switch 150, which connects all of the devices connected to the SAN fabric 110, is an encryption switch that can provide encryption/decryption services for the SAN fabric 110, as described in more detail below. Although a single SAN fabric 110 is illustrated in FIG. 1 for clarity of the description, one of ordinary skill in the art will recognize that additional fabrics can be interconnected to the SAN fabric 110, which may span multiple locations, such as a data center, a disaster recovery site, and a branch office.

Other servers or hosts, switches, and storage devices can be used in the SAN 100 illustrated in FIG. 1. The elements shown in FIG. 1 are illustrative and by way of example only, and other elements and other numbers and arrangements of elements, including other numbers of fabrics can be included as desired. In particular, the switch 150 can be a standalone switch, or a blade in a larger backbone switch.

As shown in FIG. 1, the encryption switch 150 provides for data-at-rest encryption of data stored on the RAID array 120, the tape library 130, and the JBOD 140, allowing access to the encrypted data that is stored in the SAN 140. Thus, information about encryption keys must be available to the encryption switch 150. In some embodiments, single elements shown in FIG. 1 may be implemented as redundant components, with two or more redundant elements provisioned into the network for reliability and performance reasons. For example, in a preferred embodiment, the encryption switch 150 can be provisioned as two or more redundant encryption switches 150.

In addition to the elements listed above, a key management system 170 provides for operator control over the encryption services, typically as part of a configuration management system for the SAN 100, which is not described further herein. Furthermore, a key repository 180 provides key management services to encryption switch 150.

In order to provide enterprise-wide consistent and secure encryption keys, the encryption switches 150 uses key services provided by the key repository 180. There are multiple vendors of key repositories 180, each of which may store keys differently and have a different interface for requesting keys from the key repository 180 and storing keys in the key repository 180. Example key repositories 180 include, without limitation, the NetApp Lifetime Key Management Appliance (LKM) from NetApp, the RSA Key Manager (RKM) from RSA, the HP StorageWorks Secure Key Manager from Hewlett-Packard Development Company, L.P., the IBM Tivoli Key Lifecycle Manager (TKLM) from IBM Corporation, and Thales Encryption Manager for Storage (TEMS) from Thales e-Security Inc. The specific protocol used for communicating with a specific vendor's key repository, as well as the techniques used for storing keys internal to the key repository and other internal structure of the key repository is outside the scope of the present invention.

Figure 2:
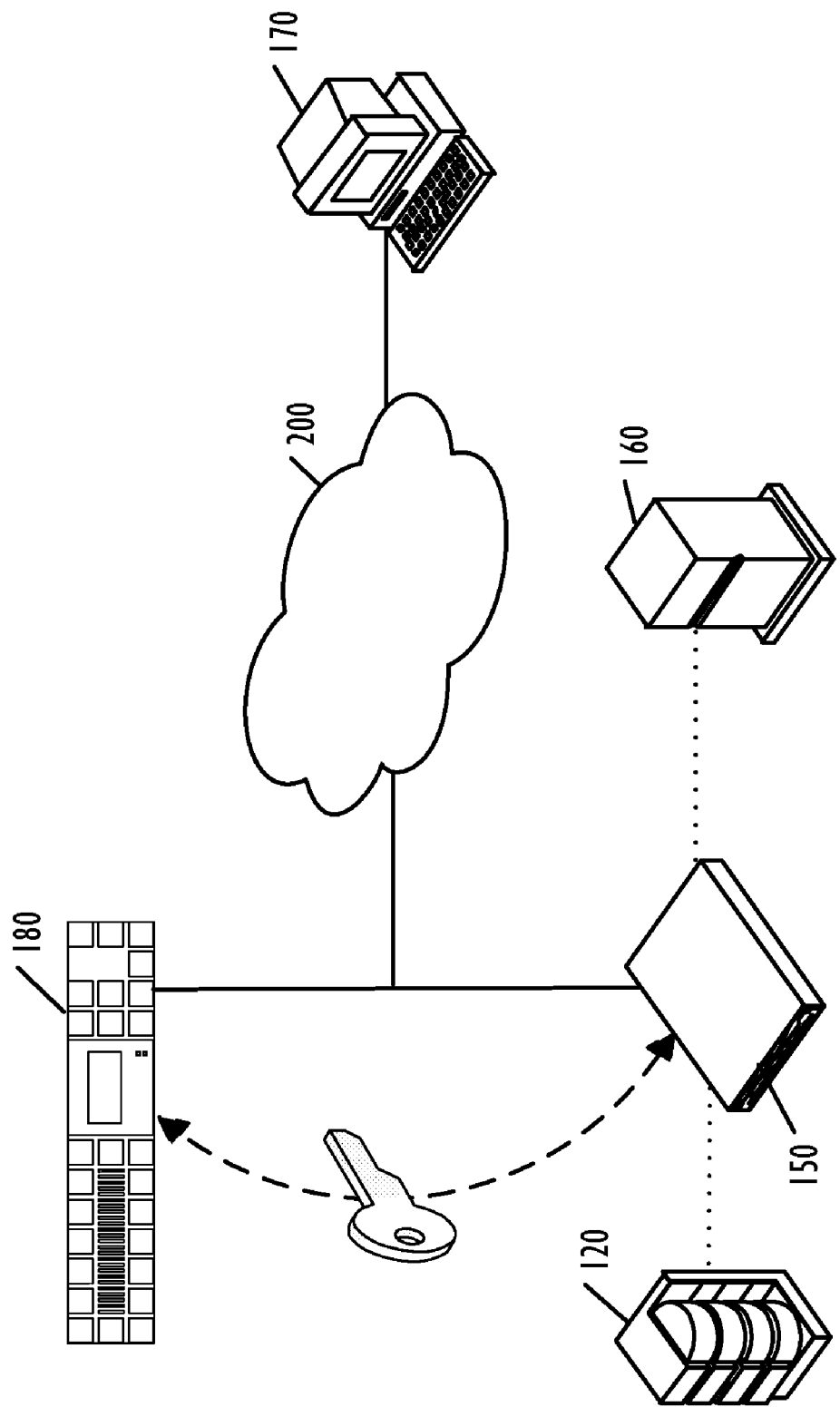
FIG. 2 is a block diagram illustrating an overview of communication paths used for key management according to one embodiment.

FIG. 2 is a block diagram illustrating an overview of one embodiment of the communication paths used for key management for a system such as is illustrated in FIG. 1. The embodiment of FIG. 2 illustrates a non-redundant implementation in which a single key repository 180 and a single encryption switch 150 is used for clarity of the description, but embodiments with redundant key repositories 180 and encryption switches 150 are generally preferred for reliability and performance reasons. The dashed lines in FIG. 2 illustrate key data flows, the solid lines are in this embodiment an Ethernet key management local area network (LAN) 200 connecting the encryption switch 150 to the key repository 180 and the key management system 170, and the dotted lines illustrate data flows between an initiator (here, one of the servers 160) and a target (here, the RAID array 120) on which is stored encrypted information.

The initiator 160 initiates a read or write request to the target 120. Data-at-rest encryption has been used to encrypt the data stored in the RAID array 120. The switch fabric 110 carries the request from the initiator 160 to the encryption switch 150. The SAN fabric 110 is typically a Fibre Channel fabric and uses Fibre Channel protocols to pass requests and responses between the initiator 160 and the target 120. The encryption switch 150 encrypts and decrypts the data read from or written to a logical unit (LUN) of the target 120.

At no time does the initiator 160 have access to the key, referred to herein as a Data Encryption Key (DEK), that is used to encrypt or decrypt data stored on the LUN of the target 120. Instead, encrypted data received from the target 120 is decrypted by the encryption switch 150 before transmitting the decrypted data to the initiator 160. In one embodiment, the encryption switch 150 limits access to DEKs to a cryptographic module of the switch 150 in compliance with the standards of Federal Information Processing Standard Publication 140-2 (FIPS 140-2) "Security Requirements for Cryptographic Modules," a copy of which is incorporated by reference herein.

The key repository 180 manages the DEKs, providing the DEKs to the encryption switch 150. The encryption switch 150 does not store the DEKs but obtains them from the key repository 180 as needed.

In addition, a management Local Area Network (LAN) 200, typically an Ethernet LAN, is used to link the management system 170 and the SAN fabric 140 devices, including the encryption switch 150.

Any desired protocol can be used to communicate between the key repository 180 and encryption switch 150. One example of such a protocol is the NetApp OpenKey Application Programming Interface (OpenKey API). Using the OpenKey API, keys that are communicated between the encryption device 150 and the key repository 180 are wrapped (encrypted) in another key before sending them within a Transport Layer Security (TLS) session. The key repository 180 manages the DEKs and performs other tasks related to managing keys for a network.

In a redundant embodiment, DEKs are synchronized between the encryption device 150 through the SAN fabric 110 and interconnected fabrics as necessary. The redundant key repositories 180 also synchronize with each other to ensure access to keys if one key repository 180 fails. These redundant key exchanges attempt to ensure that the data can be encrypted or decrypted without a single point of failure. In such a redundant embodiment, a separate cluster LAN, typically comprised of Gigabit Ethernet (GbE) links between the encryption devices and key repositories, is typically used for exchanging DEKs between the redundant key repositories 180 and encryption switches 150 in a cluster.

As described above, key repositories may be considered as a secure database for storing keys, among other things, using a keyID as the database key for accessing a key record associated with the keyID with information about a given DEK. Thus, in order to obtain a key from the key repository 180, the encryption switch 150 must determine the keyID value that corresponds to the desired key.

Figure 3:
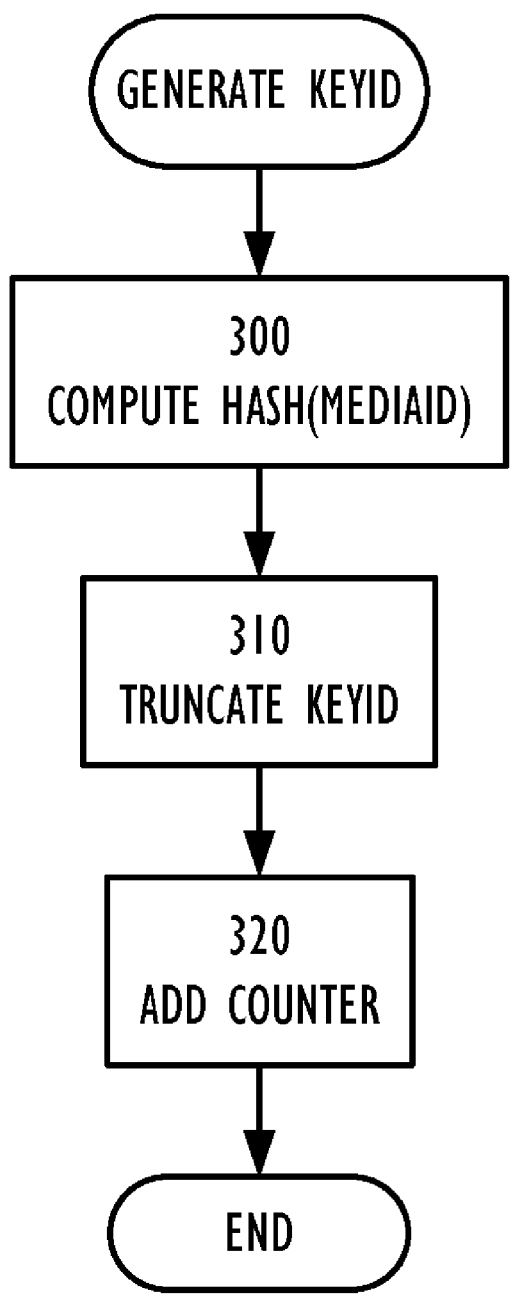
FIG. 3 is a flowchart illustrating an overview of a technique for generating a keyID according to one embodiment.

FIG. 3 is a flowchart that describes a technique for generating a keyID at a high level according to one embodiment. Instead of randomly generating keyIDs as in the prior art, the keyID is generated based on the media that is encrypted with the key. In block 300, the MediaID that corresponds to the target device 120 is hashed. In block 310, the hashed MediaID value may be truncated to a maximum size, leaving the left most significant portion of the of the hashed MediaID value to form a keyID. The truncated size of the keyID may vary depending on the key repository. For example, the keyID for a NetApp LKM may be truncated to 16 bytes. Finally, in block 320, a counter is added to the keyID value. Once the keyID has been generated according to this technique, it can be provided according to the access protocol for the key repository 180 to obtain access to the key record associated with the keyID, allowing the encryption switch to decrypt data read from the target device 120 or encrypt data written to the target device 120.

Figure 4:
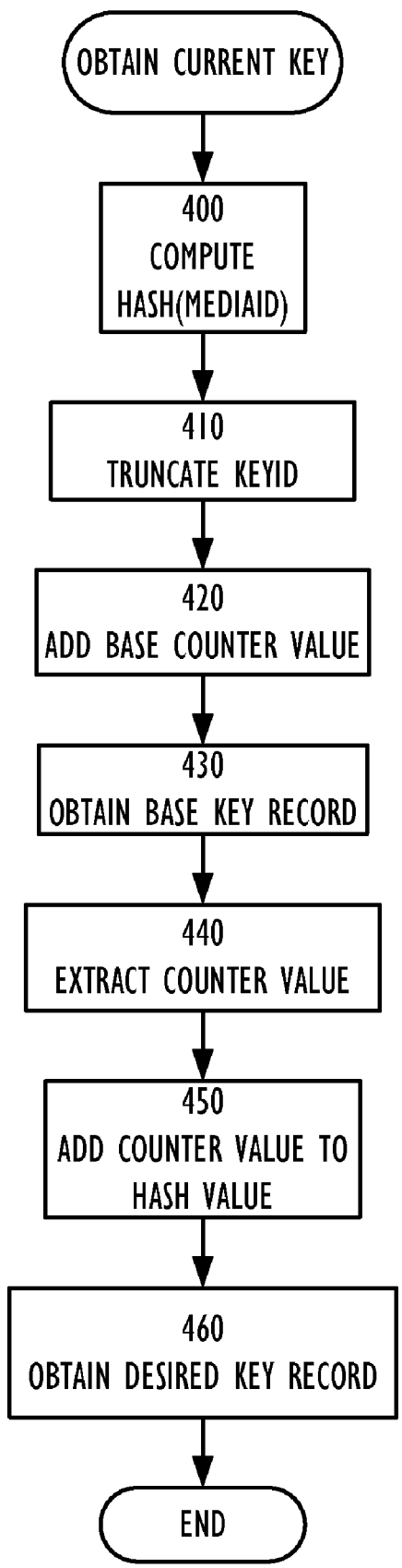
FIGS. 4-6 are flowcharts illustrating more detailed descriptions of the technique outlined in FIG. 3, according to three different scenarios.
Figure 5:
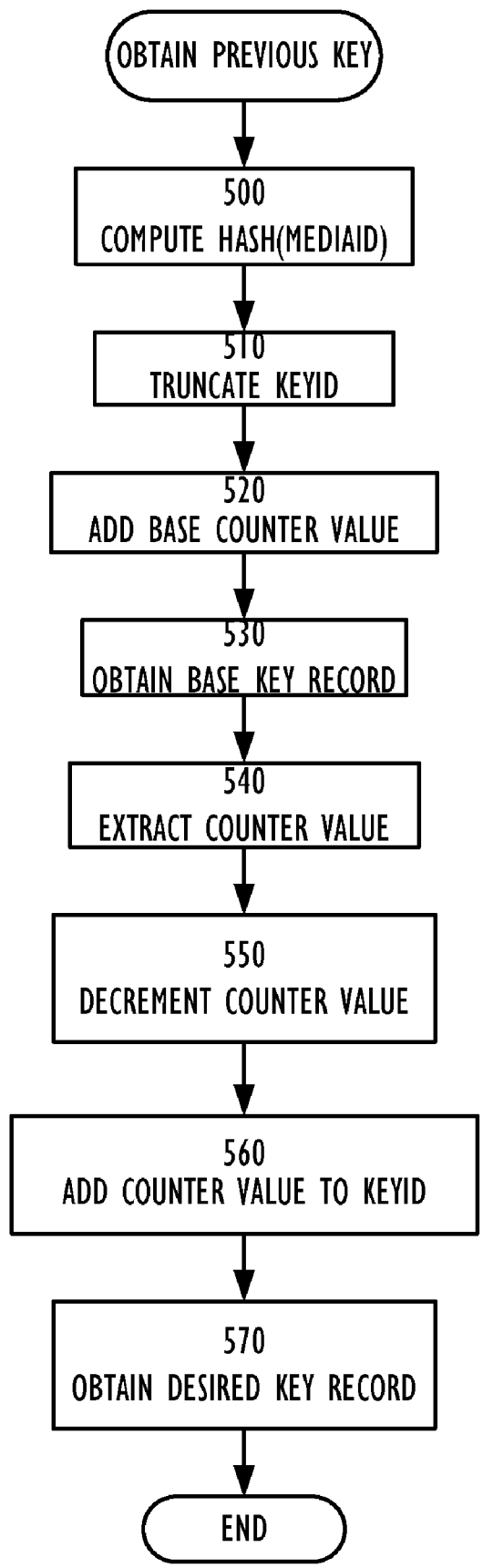
Figure 6:
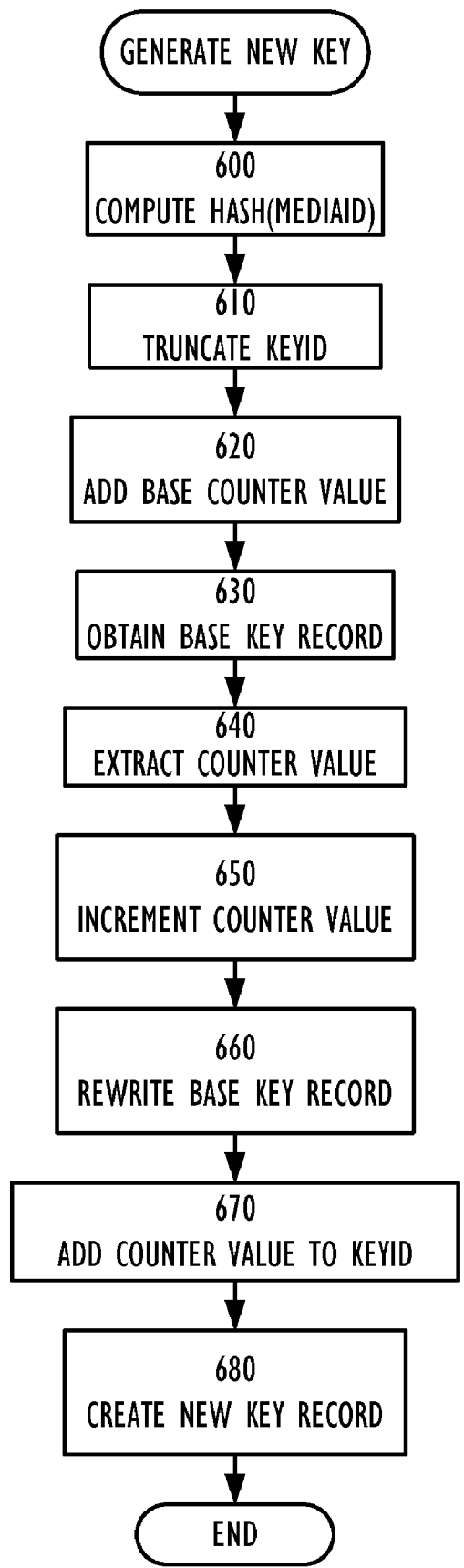

Turning to FIGS. 4-6, a more detailed description of the above technique is provided for three different scenarios. In the first scenario, illustrated in FIG. 4, the encryption switch 150 obtains the current key for a given MediaID from the key repository 180. The MediaID is a value that uniquely identifies the associated media. For storage devices other than tape volumes, the MediaID in one embodiment is the Logical Unit Name (LUN) serial number (LUNSN) of the target 120. For tape volumes, the MediaID in one embodiment is the tape volume label or the tape pool ID/label. The MediaID can be extracted from the media using standard based interactions between the media 120 and the encryption switch 150. In one embodiment, the standards used are SCSI-3 standard of Technical Committee T10 of the InterNational Committee on Information Technology Standards (INCITS) and the Fibre Channel Protocol (FCP) of Technical Committee T11 of INCITS.

In block 400, the MediaID value is hashed, producing a base keyID value. All key records in the key repository 180 for this MediaID will be associated with keyIDs based on the base keyID value. In addition to a key record for each DEK stored in the key repository 180, a base key record is stored in the key repository 180 with attributes that are used for obtaining the other key records and for other purposes that unrelated to the present invention.

According to one embodiment, the hash function used by block 400 is the Secure Hash Algorithm-256 (SHA-256) described in the FIPS publication 180-2, which is incorporated by reference herein in its entirety. In other embodiments, such as where the processing requirements of SHA-256 create negative performance impacts, Secure Hash Algorithm-1 (SHA-1) may be used. SHA-256 and SHA-1 are illustrative and by way of example only, and other hashing functions can be used.

In block 410, the base keyID is truncated to the appropriate size for the key repository 180 as discussed above. Then, in block 420, a base counter may be added to the base keyID value output by the hashing function. In an embodiment where the base counter value is zero, this action may be omitted. The base keyID is then provided as a keyID in block 430 to obtain the base key record from the key repository 180. The base key record may not contain an actual DEK, but may provide information useful for the rest of the techniques described herein, including a current counter value, as described below. In one embodiment, the current counter value is not persistent in the encryption switch 150, but is kept in the base key record. Thus, to obtain the current counter value, the encryption switch 150 may construct a keyID using the base keyID and the base counter, as described above, to obtain the base key record.

Upon receiving the base key record, the encryption switch 150 may then in block 440 extract the counter value from the base key record. The structure of the base key record may vary depending on the key repository 180. For example, in a NetApp LKM key repository, a key record (referred to as a Key Object) according to one embodiment contains:

KeyClass—Identifies the type of key contained in the Key Object, for example "kcn.1998-01.com.brocade:DEK_AES_256_XTS";

KeyFormat—Identifies the wrapping of the key, e.g. plaintext, encrypted with a link key, etc., for example, "kfn.2001-03.com.decru:wrapped_OCK";

KeyIDValue—is the Primary ID of the Key Object

KeyAttribute[1..24]—name value pairs for attributes, wherein the Name is the name of the key attribute and the Value is the value of this attribute. In one embodiment, one of these attributes is used as a Key Count attribute.

Before a Key Attribute is used in a NetApp LKM, it must be defined in the Key Attribute table. One may use the NetApp LKM key attribute add command to enter an attribute into the LKM attribute table. The table provides a mapping between the attribute name and the following values: (1) Display Name—user friendly name for the key attribute; (2) Type—the data type of the key attribute's value; and (3) IsPrimary—Boolean field that determines whether or not the key attribute can be used as database key when searching for the key object in the LKM key database.

The KeyClass, KeyFormat, and KeyIDValue tuple serves as the primary database key for accessing key records. The actual value for the encryption key being stored in the key repository 180 is stored in one of the KeyAttributes, identified as Key_Content.

According to one embodiment, the Key Count attribute includes three data fields, defined as follows: a 2 byte Count field, a 2 byte Sequence field, and a 2 byte Key State field.

There is no Key Count KeyAttribute for a regular key record containing a DEK; only the base key record contains that attribute. Other key records for that MediaID will contain the Key_Content attribute with the actual key, which is not contained in the base key record, according to one embodiment.

The base key record, which is the first record in the key repository 180 entered for a MediaID, contains the Count and Sequence fields in the Key Count attribute, but does not contain actual key data. The Count field is incremented each time a new generation of a key is created for a MediaID for non-tape storage media, while the Sequence field is incremented each time a new key is created for a new segment of a tape volume MediaID. Thus, depending on the type of storage media identified by the MediaID, the Count or Sequence field may be extracted from the base key record in block 440 and added to the base keyID in block 450.

A tape volume may have multiple keys associated with it, one for each segment. However, the keyID generator described above generates the same base keyID for all tape segments. There may also be multiple keys for a LUNSN active concurrently during a re-keying operation, each containing the same base keyID. The Key Count attribute keeps track of how many keys have been generated for a MediaID. This field allows retrieval of all key records associated with a given MediaID.

The Key State field of the Key Count KeyAttribute is used to indicate the status of a key, such as compromised, deleted, archived, etc.

Although the structure of the key record in other key repositories may differ, similar Count and Sequence fields may be stored in the key record as application specific data, allowing the same technique to be used, possibly with different field names, depending on the key repository implementation. In one embodiment, where an RSA RKM key repository is to be used, because the RSA key repository does not allow for directly setting the keyID value in a key record, an alias attribute may be used for storing the keyID. The alias attribute can be directly set, and can be used as a primary key for key repository lookup, thus provides an equivalent technique to that used in the NetApp LKM embodiment.

In block 450, the current counter, extracted from the base key record Key Count attribute Count or Sequence field, is added to the base keyID to form a keyID. Finally, in block 460, the keyID is used to obtain the key record for the current key for the MediaID in the key repository 180, extracting the current key from the key record.

A similar scenario is illustrated in FIG. 5, except that in this scenario, the encryption switch 150 obtains an earlier generation key instead of the current key. Blocks 500-540 and 560-570 are the same as blocks 400-440 and 450-460, respectively, of FIG. 4, and will therefore not be described again. In this scenario, however, instead of using the counter obtained from the base key record directly, the encryption switch in block 550 decrements the counter before performing blocks 560-570. By decrementing the counter before using it to construct the keyID and obtaining the key record, the encryption switch 150 may obtain a previous generation of the key or the key for segments of a tape volume other than the most recently written segment. By decrementing the counter once, the immediate previous generation key or tape segment key may be obtained, and by decrementing the counter more than once, earlier key generations or tape segment keys may also be obtained.

Although not shown in FIG. 5, the encryption switch 150 may easily obtain any desired range of generations of the key used to encrypt data stored on the storage medium stored with the medium associated with the MediaID by cycling through the steps 550-570, if more than one previous generation key is to be obtained, or by directly decrementing the generation counter to the desired generation if a single generation is to be obtained. Similarly, the keys for any desired range of tape volume segments can be obtained.

FIG. 6 is a flow chart illustrating a technique for storing a new generation of a key for a MediaID according to one embodiment. Blocks 600-640 are the same as blocks 400-440 of FIG. 4 and will not be described again. After obtaining the current counter value, in block 650, the counter is incremented, and in block 660, the base key record may be rewritten back to the key repository with the incremented counter value. The incremented counter may then be added to the base keyID value in block 670, creating a new keyID. Finally, in block 680, a new key record is written to the key repository using the new keyID, containing a new DEK for the MediaID. The process for generating the content of the new DEK is outside the scope of the present invention and is not described further herein.

In a non-tape medium, such as a RAID array 120 or a JBOD 140, stored data may be rekeyed from time to time with a new encryption key, typically to increase security by avoiding the use of stale keys. In one embodiment, older generation keys may be used to read stored data, but only the current generation key may be used to write data. During a rekeying process, the old key may be obtained using the technique of FIG. 4, then a new key may be generated for the storage medium identified by the MediaID and stored into the key repository 180 using the technique of FIG. 6. The currently encrypted data is then read using the old key, obtained as described above, decrypted, and then encrypted with the new key and rewritten to the storage medium.

For tape volumes, rekeying is typically not performed, thus generally only a single generation of key is used for encrypting the data written to any tape segment. Instead, different segments on the tape may be encrypted with different encryption keys. Thus a given tape volume may have multiple keys associated with it, each for different portions of the tape. The same technique is used for tape volumes as is described in FIGS. 4-6, but in the case of a tape volume, instead of adding a generation number, such as found in the Count field of the Key Count KeyAttribute in a NetApp LKM embodiment, a sequence number identifying the tape segment, such as found in the Sequence field of the Key Count KeyAttribute in a NetApp LKM embodiment, is added to the base keyID. In the NetApp LKM embodiment described above, the base key record maintains two separate attributes, one used for a generation count, and a second used as a sequence number for media, such as tape, that can have several concurrent keys associated with the MediaID. In another embodiment, a single attribute in the key record may be used for both purposes.

The generation count and sequence numbers described above are typically initialized as a zero in the base key record, and incremented by one for every generation or tape volume segment. But any convenient initial value may be used, and an increment value greater than one may be used if desired, regardless of the initial value.

The hash function chosen for the above technique preferably has a very low likelihood of generating the same hash value for different MediaID and sequence values. If the encryption switch 150 generates a new keyID that is in use by the key repository, the key repository will indicate the existence of a record with the same keyID. The encryption switch 150 may then generate a new keyID by once again incrementing the sequence number or generation count, adding it to the base keyID, and trying again to create a new key record with the new keyID.

Figure 7:
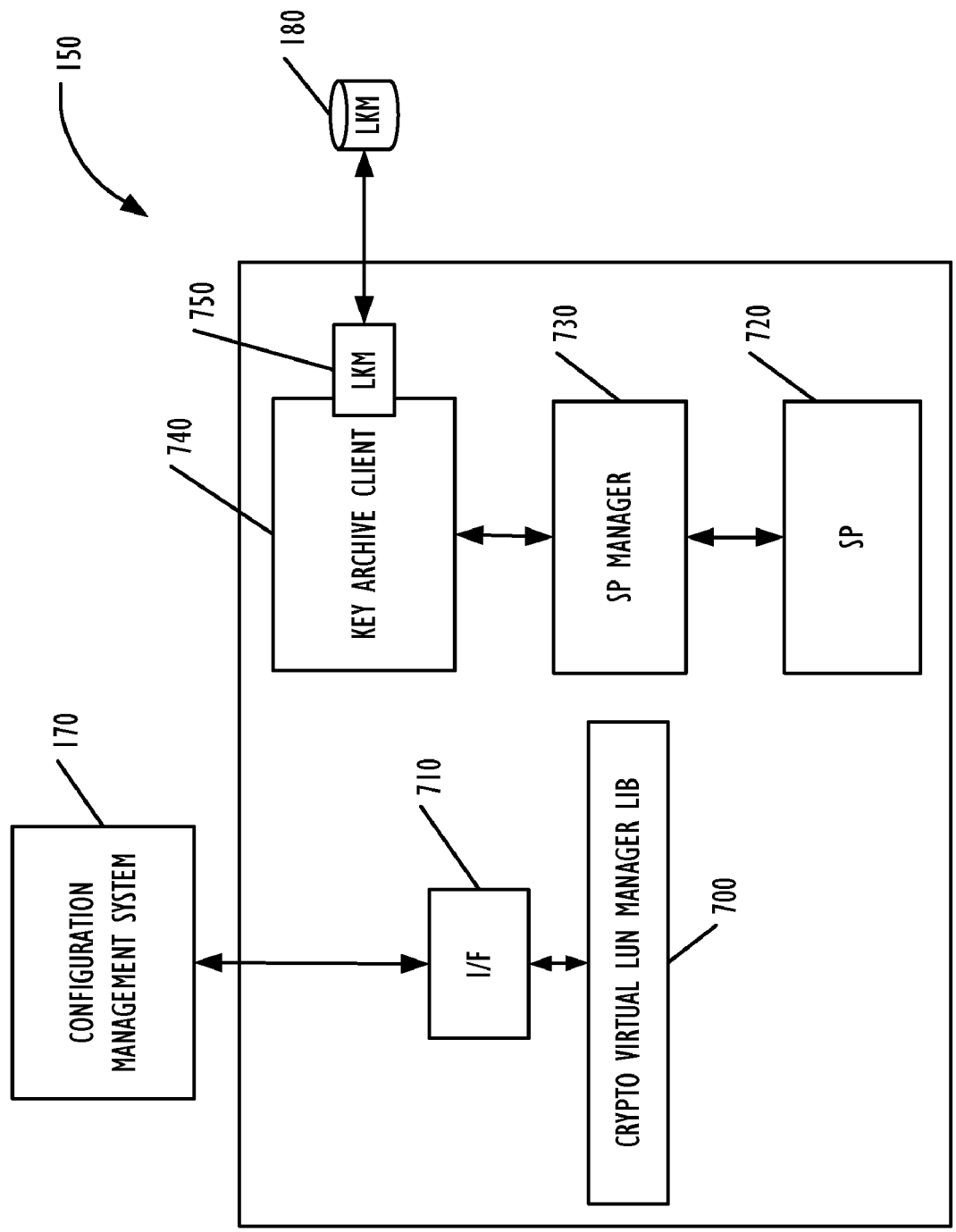
FIG. 7 is a block diagram illustrating a software architecture for implementing the techniques illustrated in FIGS. 3-6, according to one embodiment.

FIG. 7 is a block diagram illustrating a software architecture for implementing the above-described techniques according to one embodiment of an encryption switch 150. A user can interact with the encryption switch 150 through a configuration management system 170, typically using a management console that provides users and administrators the ability to execute commands, or run a web based UI. Most operations on keys may be performed from a single management console in one embodiment. Interface modules 710 may provide remote programmatic, command line, or web interfaces between the configuration management system 170 and a crypto/LUN manager module 700 for switch management functions, plus additional interfaces for key operations.

A Key Archive Client (KAC) module 740 provides the encryption switch 150 with a general interface to interact with the various key repositories 180, via specific plug-in modules or adapters 750 that perform the necessary translations for specific key repositories 180. For example, in FIG. 7, plugin 750 is an LKM plugin, designed to interact with a NetApp LKM repository 180.

A security processor management module 730 provides an interface between a security processor module 720 and the key archive client 740. The security processor module 720 performs key generation, key encryption, and key injection into the cryptographic engines of the encryption switch 150. In one embodiment, the security processor module 720 is a security processor operating system that provides FIPS Level 3 compliance.

Figure 8:
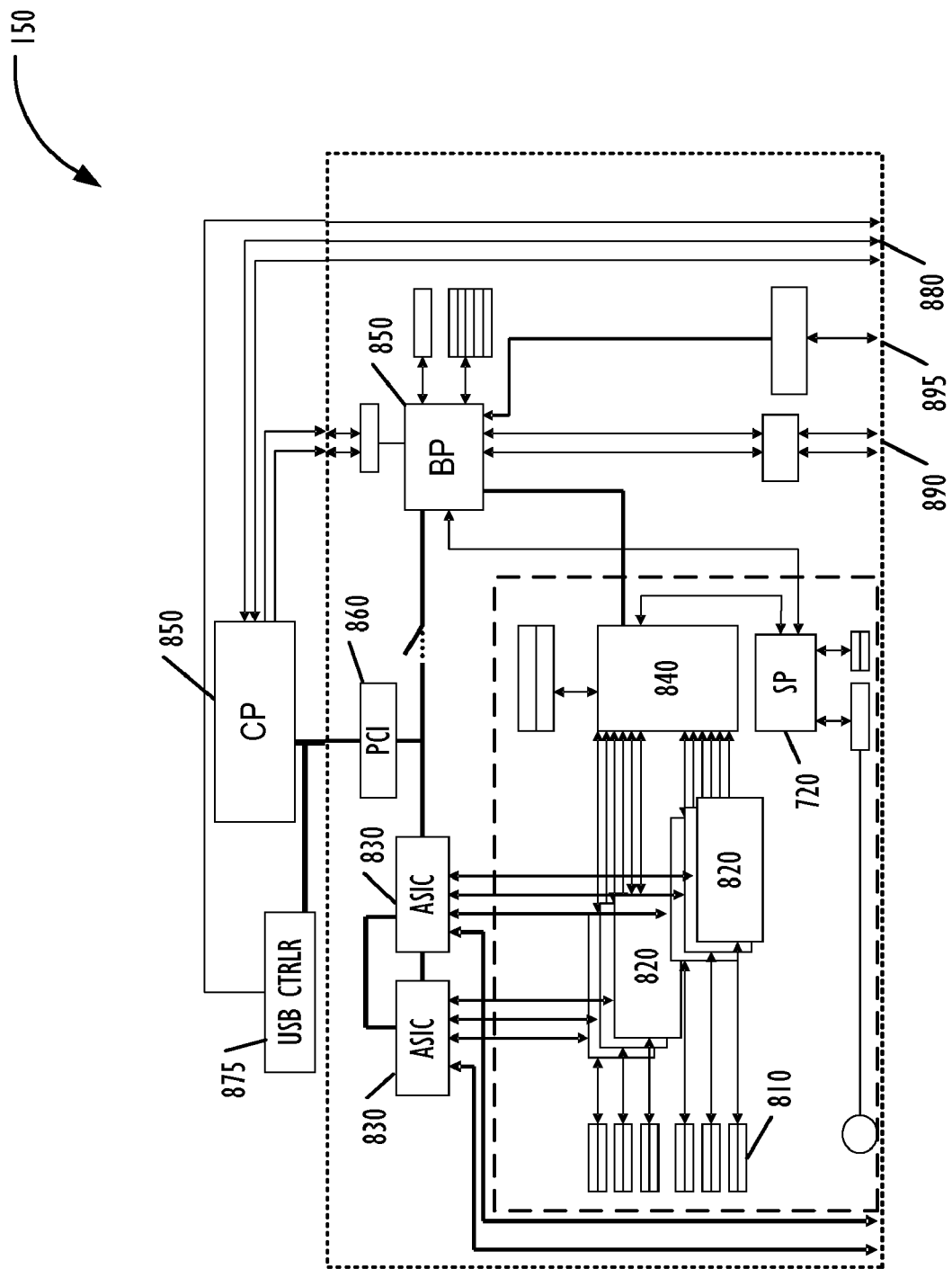
FIG. 8 is a block diagram illustrating a hardware apparatus associated with the software architecture of FIG. 7, according to one embodiment.

Turning to FIG. 8, a block diagram illustrates major hardware components of the encryption switch 150 that execute the software architecture of FIG. 7. The encryption switch 150 may be constructed as a standalone switch or as a blade in a larger data center switch chassis. If the encryption switch 150 is a blade, then the portion of FIG. 7 enclosed in the dotted line may be sufficient, while the additional components may be used for a standalone switch. The dashed line indicates a secure cryptographic module 800, which performs encryption and decryption for the encryption switch 150. The cryptographic module 800 preferably is protected from physical tampering by physical security techniques such as a hardened case and tampering detection hardware that interface with the security processor 720 contained in the cryptographic module 800, so that an attempt to tamper with the cryptographic module 800 will cause the security processor to destroy encryption information contained in the cryptographic module 800, including destruction of encryption key information used for communication with the key repository 180.

According to this embodiment, a plurality of encryption FPGAs 820 that perform the actual algorithms for encryption and decryption of data interact with a pair of Fibre Channel protocol ASICs 830 for transmitting and receiving data from initiators and targets on the SAN 100. A control FPGA 840 controls the operation of the encryption FPGAs 820, and provides an interface to a blade processor 850 and the security processor 720.

The blade processor 850 provides processing capability for the switch operating system, including software for interacting with the key repository 180, such as the key archive client 740. The blade processor 850 also controls Gigabit Ethernet ports 890 and a smart card interface 895 used for authentication purposes. In a standalone switch 150, an additional control processor 850 provides additional control functions for the encryption switch 150, through a PCI-e bridge 860, and connections to the blade processor 850. The control processor 850 and a USB controller 875 provide further control for RS232 and 10/100 M Ethernet links 880.

The above-described techniques provide a capability to use a key repository to provide a secure database for the storage of encryption keys that allows easy lookup of encryption keys in the key repository, using a deterministic transformation of an identifier for the media on which the encrypted data is stored as a base for the key repository lookup key, without needing to create and maintain external lookup tables to associate key repository lookup keys with the media identifiers. The techniques also provide an easy way to obtain one or multiple generations of keys without keeping information external to the key repository that would need to be replicated across a distributed cluster of switches, thus making manageability of key information more secure and avoiding consistency problems.

Although the above description has been written in the context of embodiments using in-band devices such as encryption switches to encrypt and decrypt data passing between hosts and storage devices, the scope of the present invention is not limited to such embodiments. For example, in some embodiments, instead of encryption and decryption occurring at intervening switches, the encryption and decryption may be performed at the storage devices of the SAN 100 that serve as targets, or at the hosts that serve as initiators of SAN requests. In some embodiments, the key repository may use out-of-band communication to the device performing encryption or decryption, allowing the initiator or target device to perform its own encryption or decryption using the keys retrieved from the key repository. Although described in the context of a SAN, the above-described techniques are applicable to any environment in which encryption keys are stored in a key repository.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Various changes in the details of the illustrated operational methods are possible without departing from the scope of the following claims. For instance, the illustrative flowchart steps or process steps of FIGS. 4-6 may perform the identified steps in an order different from that disclosed here, including concurrently. Alternatively, some embodiments may combine the activities described herein as being separate steps. Similarly, one or more of the described steps may be omitted, depending upon the specific operational environment in which the method is being implemented. In addition, acts in accordance with FIGS. 4-6 may be performed by a programmable device executing instructions organized into one or more program modules. A programmable device may comprise a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable media, suitable for tangibly embodying program instructions include, but are not limited to: magnetic disks (fixed, floppy, and removable) and tape; optical media such as compact disc read-only memory devices (CD-ROMs) and digital versatile discs ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

While certain exemplary embodiments have been described in details and shown in the accompanying drawings, it is to be understood that such embodiments are merely illustrative of and not devised without departing from the basic scope thereof, which is determined by the claims that follow.

We claim:

1. A method, comprising:
hashing a media identifier associated with a data storage medium to produce a base key identifier using a processor;
obtaining a base key record associated with the base key identifier from a key repository;
extracting a counter value from the base key record; and
adding the counter value to the base key identifier to produce the key identifier; and
accessing a key record associated with the key identifier in the key repository.

2. The method of claim 1,
wherein the act of adding the counter value to the base key identifier to produce the key identifier comprises:
incrementing the counter value to produce an incremented counter value;
adding the incremented counter value to the base key identifier to produce the key identifier;
storing the incremented counter value in the base key record; and
storing the base key record in the key repository.

3. The method of claim 2,
further comprising:
generating a new encryption key; and
generating a new key record, comprising the new encryption key,
wherein the act of accessing a key record associated with the key identifier in the key repository comprises:
storing the new key record associated with the key identifier in the key repository.

4. The method of claim 3, further comprising:
encrypting data with the new encryption key for storage on the data storage medium.

5. The method of claim 1,
wherein the act of adding the counter value to the base key to produce the key identifier comprises:
decrementing the counter value to produce a decremented counter value;
adding the decremented counter value to the base key identifier.

6. The method of claim 5, wherein the act of accessing a key record associated with the key identifier in the key repository comprises:
obtaining a key record associated with the key identifier from the key repository; and
extracting a data encryption key from the key record.

7. The method of claim 6, further comprising:
decrypting data from the data storage medium with the data encryption key.

8. The method of claim 1, wherein the act of hashing a media identifier comprises:
hashing the media identifier with a secure hash algorithm.

9. The method of claim 1, wherein the counter value indicates how many encryption keys have been generated for the media identifier.

10. The method of claim 1, further comprising:
truncating the base key identifier to a predetermined length, depending on the key repository.

11. A non-transitory machine-readable storage medium, with instructions for a programmable device stored thereon wherein the instructions cause a processor of the programmable device to perform the method of claim 1.

12. A programmable device, comprising:
a processor; and
a storage medium, operatively coupled to the processor, on which is stored software which when executed by the processor causes the processor to perform actions comprising:
hashing a media identifier associated with a data storage medium to produce a base key identifier;
obtaining a base key record associated with the base key identifier from a key repository;
extracting a counter value from the base key record; and
adding the counter value to the base key identifier to produce the key identifier; and
accessing a key record associated with the key identifier in the key repository.

13. The programmable device of claim 12,
wherein the action of adding the counter value to the base key identifier to produce the key identifier comprises:
incrementing the counter value to produce an incremented counter value;
adding the incremented counter value to the base key identifier to produce the key identifier;
storing the incremented counter value in the base key record; and
storing the base key record in the key repository.

14. The programmable device of claim 13,
further comprising:
generating a new encryption key;
generating a new key record, comprising the new encryption key,
wherein the action of accessing a key record associated with the key identifier in a key repository comprises storing the new key record associated with the key identifier in the key repository.

15. The programmable device of claim 14, further comprising:
a cryptographic engine configured to encrypt data with the new encryption key for storage on the data storage medium.

16. The programmable device of claim 12,
wherein the action of adding a counter value further comprises:
wherein the action of adding the counter value to the base key to produce the key identifier comprises:
decrementing the counter value to produce a decremented counter value;
adding the decremented counter value to the base key identifier to produce the key identifier.

17. The programmable device of claim 16,
wherein the action of accessing a key record associated with the key identifier in a key repository comprises:
obtaining a key record associated with the key identifier from the key repository; and
extracting a data encryption key from the key record.

18. The programmable device of claim 17, further comprising:
a cryptographic engine configured to decrypt data from the data storage medium with the data encryption key.

19. The programmable device of claim 12, wherein hashing a media identifier comprises:
hashing the media identifier with a secure hash algorithm.

20. The programmable device of claim 12, wherein the counter value indicates how many encryption keys have been generated for the data storage medium.

21. The programmable device of claim 12,
wherein the data storage medium is a tape volume, and
wherein the counter value indicates a segment of the tape volume.

22. The programmable device of claim 12, further comprising:
truncating the base key identifier to a predetermined length, depending on the key repository.

23. The programmable device of claim 12, wherein the programmable device is a switch.

24. The programmable device of claim 12, wherein the programmable device is a data storage device associated with the data storage medium.

25. A system comprising:
a key repository, configured to store data encryption keys; and
an encryption device, comprising:
a processor; and
a storage medium, operatively coupled to the processor, on which is stored software which when executed by the processor causes the processor to perform actions comprising:
hashing a media identifier associated with a data storage medium to produce a base key identifier;
obtaining a base key record associated with the base key identifier from the key repository;
extracting the counter value from the base key record; and
adding the counter value to the base key identifier to produce the key identifier; and
accessing a key record associated with the key identifier in the key repository.

26. The system of claim 25, further comprising:
a configuration management system, adapted to communicate with the encryption device and to configure the encryption device.

* * * * *